(12) United States Patent
Kim

(10) Patent No.: US 8,397,881 B2
(45) Date of Patent: Mar. 19, 2013

(54) PARKING BRAKE APPARATUS

(75) Inventor: Wooyeol Kim, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 834 days.

(21) Appl. No.: 12/574,385

(22) Filed: Oct. 6, 2009

(65) Prior Publication Data

US 2010/0269620 A1    Oct. 28, 2010

(30) Foreign Application Priority Data

Apr. 23, 2009    (KR) .................. 10-2009-0035355

(51) Int. Cl.
*B60K 20/00*    (2006.01)

(52) U.S. Cl. .................. 188/82.2; 192/219.7; 74/473.24

(58) Field of Classification Search ........... 74/411.5, 74/473.24, 480 R, 481; 192/219.5, 219.7; 475/132; 188/82.2, 82.3

See application file for complete search history.

(56) References Cited

U.S. PATENT DOCUMENTS

| | | | |
|---|---|---|---|
| 4,454,936 A * | 6/1984 | Wise | 192/219.7 |
| 7,270,027 B2 | 9/2007 | Berger et al. | |
| 2004/0248687 A1* | 12/2004 | Powell et al. | 475/132 |
| 2007/0191182 A1* | 8/2007 | Koski et al. | 477/96 |

FOREIGN PATENT DOCUMENTS

| | | |
|---|---|---|
| EP | 0 612 640 A2 | 8/1994 |
| JP | 2007-203783 A | 8/2007 |
| JP | 2007-261357 A | 10/2007 |
| JP | 2009-63006 A | 3/2009 |

* cited by examiner

*Primary Examiner* — Christopher Schwartz
(74) *Attorney, Agent, or Firm* — Morgan, Lewis & Bockius LLP

(57) ABSTRACT

A parking brake apparatus may include a parking brake actuator that has a housing that is fixed to a transmission case and a piston including a piston rod, wherein the piston is mounted in the housing to reciprocate along the housing, a lever pivotally coupled to the transmission case, wherein one end portion of the lever is pivotally connected to the piston rod, a sprag rod that is pivotally connected to the other end portion of the lever, and an operational elastic member that is disposed around a rotary shaft of the lever and elastically supports the lever in one rotational direction against the transmission case, wherein the rotary shaft is rotatably coupled to the transmission case.

4 Claims, 2 Drawing Sheets

PARKING BRAKE APPARATUS

CROSS-REFERENCE TO RELATED APPLICATION

The present application claims priority to Korean Patent Application Number 10-2009-0035355 filed Apr. 23, 2009, the entire contents of which application is incorporated herein for all purposes by this reference.

BACKGROUND OF THE INVENTION

1. Field of the Invention

The present invention relates to a parking brake apparatus, in more detail, a parking brake apparatus that can ensure the parking condition of a vehicle without transmitting operational force of a driver through a mechanical power transmission process.

2. Description of Related Art

Automated transmissions, such as automatic transmission or automated manual transmission, in the related art, generally have used a mechanism that is configured such that a parking gear fitted on an output shaft connected to driving wheels of a vehicle is fixed by a parking sprag, a parking cam that is operated through a cable transmitting operational force of a driver actuates the parking sprag to change the fixed position of the parking gear, thereby changing the parking condition.

On the other hand, recently, a mechanism that mounts a parking brake actuator, which makes it possible to change the fixed position of a parking gear by hydraulic pressure and electricity, in a transmission is used, such that it is possible to change the parking condition without directly and mechanically transmitting operational force of a driver through a cable.

The parking brake actuator generally changes the fixed position of the parking gear by motion of a piston rod of a piston that reciprocates straight, in which the motion in one direction of the straight motion direction of the piston is made by hydraulic pressure and the motion in the opposite direction is made by the elasticity of a spring. Therefore, the actuator is provided with a configuration of moving the piston using the hydraulic pressure and a configuration of applying the elasticity of the spring in to opposite direction, such that the structure is complicated and the size of the package increases, and accordingly, it is difficult to mount the parking brake actuator in a transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a parking brake apparatus that makes it possible to change the parking condition of a vehicle without transmitting operational force of a driver through a mechanical cable, using a parking brake actuator, to simplify the configuration of the parking brake actuator, and to more easily mount the parking brake actuator to a transmission.

In an aspect of the present invention, the parking brake apparatus may include a parking brake actuator that has a housing that is fixed to a transmission case and a piston including a piston rod, wherein the piston is mounted in the housing to reciprocate along the housing, a lever pivotally coupled to the transmission case, wherein one end portion of the lever is pivotally connected to the piston rod, a sprag rod that is pivotally connected to the other end portion of the lever, and an operational elastic member that is disposed around a rotary shaft of the lever and elastically supports the lever in one rotational direction against the transmission case, wherein the rotary shaft is rotatably coupled to the transmission case.

The parking brake actuator may have a hydraulic chamber enclosed by the housing and the piston and moves the piston to unlock a parking gear by using hydraulic pressure supplied to the hydraulic chamber and the housing has a release port to selectively supply the hydraulic pressure to the hydraulic chamber, the housing of the parking brake actuator is fixed to a valve body of the transmission case to be fixed with respect to the transmission housing, and the operational elastic member is configured to provide elastic force to the lever to move the piston of the parking brake actuator to lock the parking gear when the hydraulic pressure in the hydraulic chamber is removed.

A connection pin for connecting the piston rod to the one end portion of the lever may be provided to an end portion of the piston rod of the piston.

A guide slot may be formed to the one end portion of the lever and the connection pin is slidably inserted and guided along the guide slot to convert a motion of the piston rod into a rotational motion of the lever.

The operational elastic member may be a torsion spring with one end portion thereof fixed to the lever, the other end thereof fixed to the transmission case, and the coil portion disposed around the rotary shaft of the lever.

In various aspects of the present invention, the parking brake apparatus makes it possible to change the parking condition of a vehicle without transmitting operational force of a driver through a mechanical cable, using a parking brake actuator, to simplify the configuration of the parking brake actuator, and to more easily mount the parking brake actuator to a transmission.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
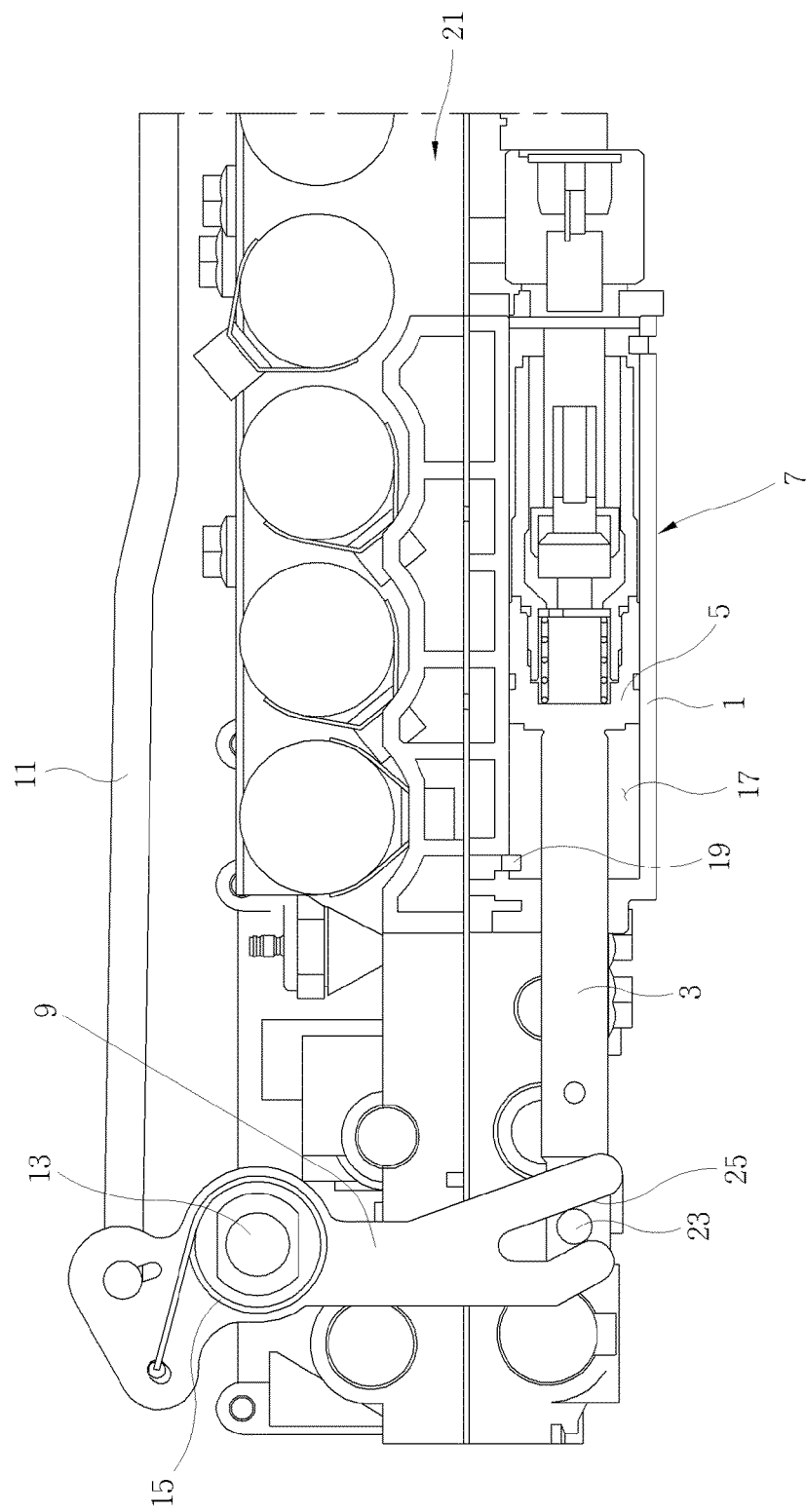
FIG. 1 is a view showing a parking brake apparatus according to an exemplary embodiment the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
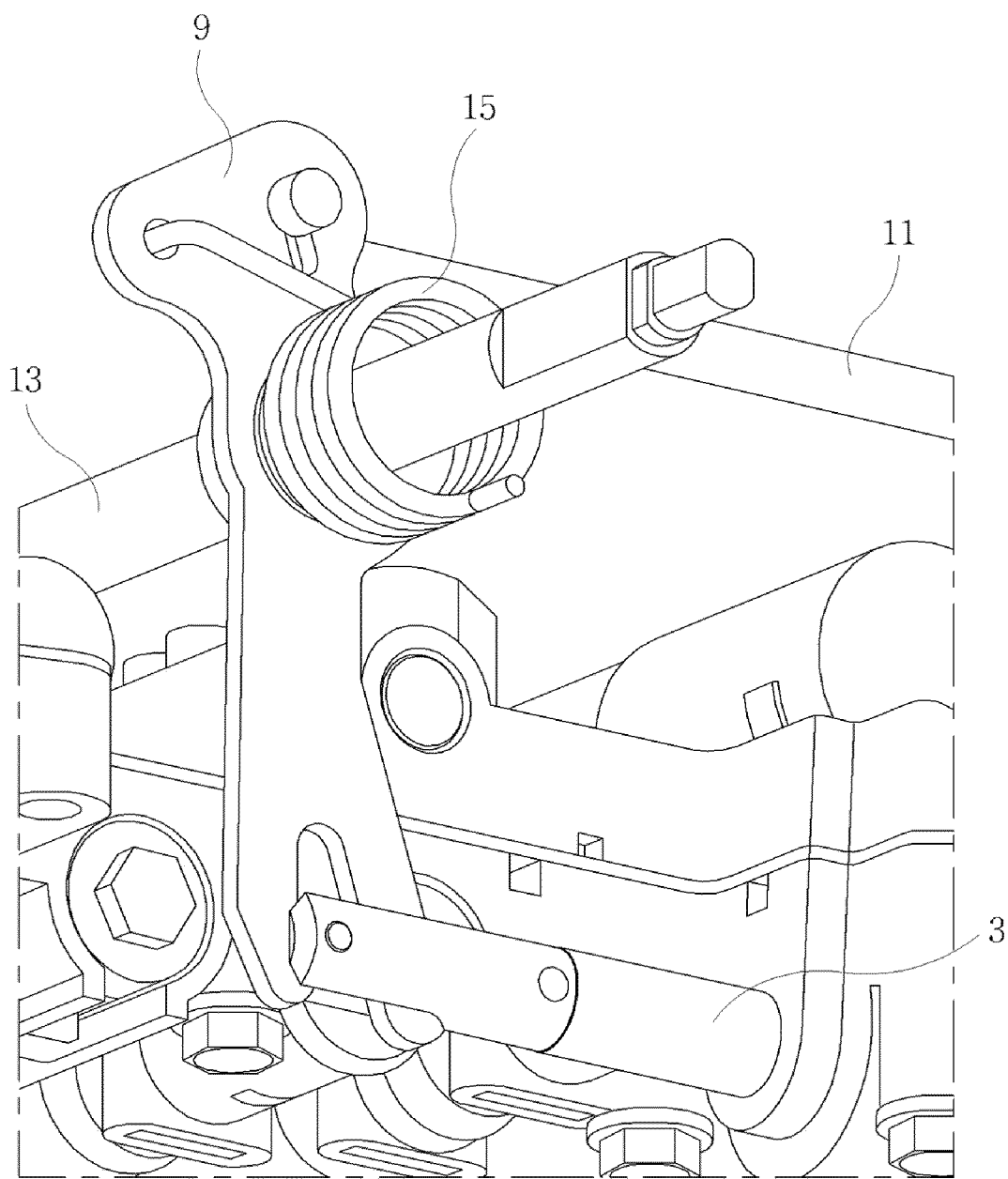
FIG. 2 is a view showing the apparatus of FIG. 1 at a different angle.

Referring to FIGS. 1 and 2, an exemplary embodiment of the present invention includes, a parking brake actuator 7 that has a housing 1 that is fixed to a transmission case and a piston 5 with an extending piton rod 3 which is mounted to reciprocate straight with respect to housing 1, a lever 9 of which one end is connected to piston rod 3 of parking brake actuator 7, a sprag rod 11 that is connected to the other end of lever 9, and an operational spring 15 that is disposed around a rotary shaft 13 of lever 9 and elastically supports lever 9 in any one rotational direction against the transmission case.

Parking brake actuator 7 has a hydraulic chamber 17 that moves piston 5 in the un-parking direction using hydraulic pressure between housing 1 and piston 5 and housing 1 has a release port 19 to supply hydraulic pressure to hydraulic chamber 17, in which housing 1 of parking brake actuator 7 is fixed to a valve body 21 to be fixed with respect to a transmission case.

That is, the hydraulic pressure can be directly supplied to release port 19 of housing 1 from valve body 21 by fixing housing 1 of parking brake actuator 7 to valve body 21. Further, different from the related art, the spring for moving piston 5 in the parking direction is not provided to parking brake actuator 7, and instead, operational spring 15 is disposed separate from parking brake actuator 7, such that the parking brake can be mounted in the transmission with a compact configuration.

Further, operational spring 15 is disposed to provide elastic force to lever 9 in the direction for moving piston 5 of parking brake actuator 7 in the parking direction.

A connection pin 23 for connection with lever 9 is provided to piston rod 3 of piston 5 and a guide slot 25 where connection pin 23 is inserted and guided to convert the straight motion of piston rod 3 into rotational motion of lever 9 is formed at one end of lever 9. Further operational spring 15 is a torsion spring with one end fixed to lever 9, the other end fixed to the transmission case, and the coil portion disposed around rotary shaft 13 of lever 9.

A sprag is connected to sprag rod 11 connected to the other end of lever 9 and the sprag changes the parking condition of a vehicle by fixing the parking gear when sprag rod 11 is pushed and releasing the parking gear when sprag rod 11 is pulled.

In the parking brake apparatus having the above configuration, when the pressure in hydraulic chamber 17 of housing 1 is removed, lever 9 is rotated with respect to the transmission case by the elastic force of operational spring 15 such that piston rod 3 is pulled to the left and sprag rod 11 is pushed to the right in FIG. 1, and the sprag connected to sprag rod 11 correspondingly fixes the parking gear, thereby achieving a locked-parking condition of a vehicle.

On the contrary, in order to remove the locked-parking condition, as hydraulic pressure is applied into hydraulic chamber 17, piston 5 is pushed to the right in FIG. 1, the force is applied to lever 9 such that sprag rod 11 is pulled to the left, and the fixed parking gear is correspondingly released, thereby achieving an unlocked-parking condition.

Further, parking brake actuator 7 may be further provided with a locking device that prevents piston 5 from being returned by the elastic force of operational spring 15 to continuously and stably maintain the unlocked-parking condition.

For convenience in explanation and accurate definition in the appended claims, the terms "left" and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking brake apparatus, comprising:
   a parking brake actuator that has a housing that is fixed to a transmission case and a piston including a piston rod, wherein the piston is mounted in the housing to reciprocate along the housing;
   a lever pivotally coupled to the transmission case, wherein one end portion of the lever is pivotally connected to the piston rod;
   a sprag rod that is pivotally connected to the other end portion of the lever; and
   an operational elastic member that is disposed around a rotary shaft of the lever and elastically supports the lever in one rotational direction against the transmission case, wherein the rotary shaft is rotatably coupled to the transmission case;
   wherein the parking brake actuator has a hydraulic chamber enclosed by the housing and the piston and moves the piston to unlock a parking gear by using hydraulic pressure supplied to the hydraulic chamber and the housing has a release port to selectively supply the hydraulic pressure to the hydraulic chamber,
   the housing of the parking brake actuator is fixed to a valve body of the transmission case to be fixed with respect to the transmission housing, and
   the operational elastic member is configured to provide elastic force to the lever to move the piston of the parking brake actuator to lock the parking gear when the hydraulic pressure in the hydraulic chamber is removed.

2. The parking brake apparatus as defined in claim 1, wherein
   a connection pin for connecting the piston rod to the one end portion of the lever is provided to an end portion of the piston rod of the piston.

3. The parking brake apparatus as defined in claim 2, wherein a guide slot is formed to the one end portion of the lever and the connection pin is slidably inserted and guided along the guide slot to convert a motion of the piston rod into a rotational motion of the lever.

4. The parking brake apparatus as defined in claim 1, wherein the operational elastic member is a torsion spring with one end portion thereof fixed to the lever, the other end thereof fixed to the transmission case, and the coil portion disposed around the rotary shaft of the lever.

* * * * *